Figure 1:
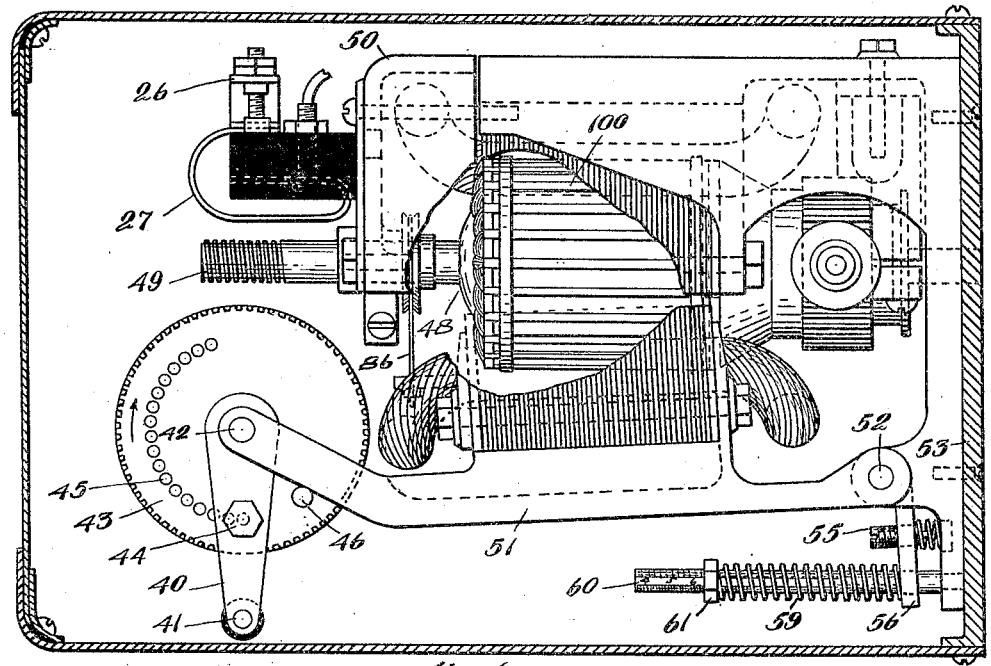

G. A. BURNHAM.
TIME LIMIT CONTROLLING DEVICE FOR ELECTRIC SWITCHES.
APPLICATION FILED JAN. 8, 1913.

1,140,248. Patented May 18, 1915.

Witnesses:
H. B. Davis.
H. Peterson

Inventor:
George A. Burnham.
by Ayer & Harriman
attys.

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

TIME-LIMIT CONTROLLING DEVICE FOR ELECTRIC SWITCHES.

1,140,248.  Specification of Letters Patent.  Patented May 18, 1915.

Application filed January 8, 1913. Serial No. 740,766.

*To all whom it may concern:*

Be it known that I, GEORGE A. BURNHAM, a citizen of the United States, residing at Saugus, in the county of Essex and State of Massachusetts, have invented an Improvement in Time-Limit Controlling Devices for Electric Switches, of which the following is a specification.

This invention relates to improvements in selective time-limit controlling-devices for electric switches, and is a species of the generic type of patent #1,041,716, dated October 15, 1912. The selective time-limit controlling-device of said patent has an operating-device requiring a prolonged period of time to operate the switch, and means responsive to an overload to actuate said operating-device, which means consumes varying periods of time in causing the operating device to operate the switch according to the current value of the overload, up to a predetermined current value, and constant periods of time regardless of the current value of the overload on overloads of higher current values.

In the embodiment of the invention the means responsive to the overload exerts a force proportionate to the current value of the overload up to a predetermined current value, and exerts a constant force regardless of the current value of the overload in overloads of higher current values, and such embodiment of the invention results in actuating the operating-device at a variable speed according to the current value of the overload up to a predetermined current value and at a definite speed regardless of the current value of the overload on overloads of higher current value. An electric-motor of the rotary type is shown as the means for accomplishing these results, and it is stated in the specification of said patent that the force exerted by the armature is proportionate to the current value of the overload up to the point of saturation and above said point is constant, regardless of the current value of the overload. Hence the maximum speed attained by the armature is at the point of saturation. However, the motor may be so arranged that the force exerted by its armature is proportionate to the current value of the overload up to a point where the speed of the armature corresponds to or is in synchronism with the frequency of the current and above said point is constant. This point is well suited for making the change from variable to constant. At the present time twenty-five and sixty cycle currents are largely used, and by my present invention it is possible to arrange the motor of the time-limit controlling-device, particularly when said motor is of the rotary type, so that its operation will be accurately determined on both of these currents, and, therefore, becomes an additional factor in assisting in making the device truly selective.

In carrying out my invention I may employ a rotary repulsion motor of the type having an additional winding of the "squirrel-cage" form, but while this particular form of motor possesses advantages, yet other forms of motors may be employed in lieu thereof.

Figure 2:
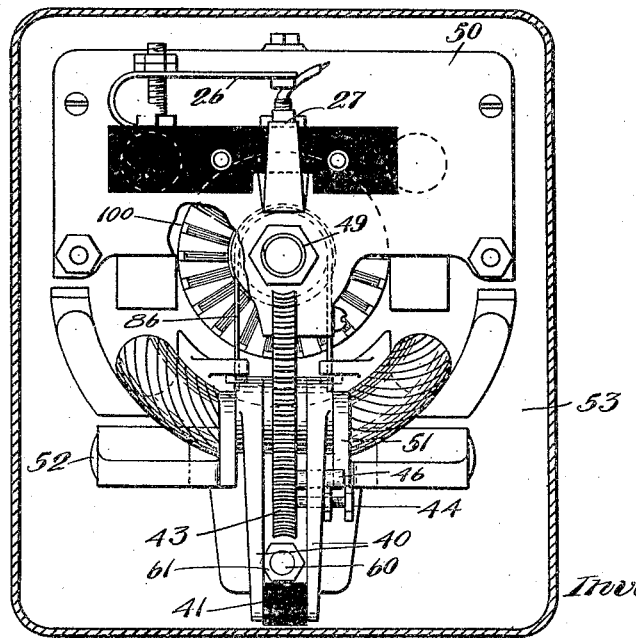

Figure 1 is a side elevation of a time-limit controlling device embodying this invention. Fig. 2 is an end view of the same.

In general the construction of the time-limit controlling device is the same as in the patent referred to, and in so far as the same is applicable to my present invention, will now be briefly described.

26 represents a stationarily supported circuit-closing member; 27 a movable circuit-closing member arranged for engagement with said member 26 to close the circuit to operate the switch.

40 represents a rotarily movable arm bearing a cross-piece 41, said arm being movable through an interval of space to engage the member 27 and move it into engagement with the member 26, after a prolonged period of time. Said arm 40 is loosely mounted on a shaft 42, bearing a worm-wheel 43, and is adapted to be connected with said worm-wheel by a screw 44, entering any one of a series of holes 45. Said worm-wheel has a laterally extended pin 46 for engagement with a stop on the frame to determine its normal position or starting point. The worm-wheel is movable into and out of engagement with its actuator, and when in engagement therewith is rotated, but when disengaged therefrom is immediately caused to resume its normal position. As an actuator for the worm-wheel the end of the motor-shaft is threaded as at 49, and said threaded end is arranged in position to be engaged by the worm-wheel 43.

The rotary repulsion motor here shown has the general characteristics of a series motor, whereby the speed of the armature is variable according to the strength or value of the current up to a certain point and beyond or above such point is constant. Herein the point selected for changing from the variable to the constant is when the motor has attained a speed corresponding or relatively corresponding to or in synchronism with the frequency of the current, and while the armature has its usual winding thereon, another winding of the "squirrel-cage" type represented at 100, is also arranged on the armature, outside of the aforesaid winding, which acts to prevent or may be adjusted to act to prevent the motor attaining a speed greater than that in synchronism with the frequency of the current.

Movable-means arranged in the magnetic-field of the motor are employed to move the worm-wheel into and out of engagement with its actuator, and, herein the field-frame of the motor has a movable part 51, connected with it by a pivot-pin 52, or otherwise, which bears the worm-wheel 43, and said movable part of the field-frame being in the magnetic-field will be moved by the attractive influence of said field, thereby to move the worm-wheel into engagement with its actuator, and will immediately resume its normal position upon cessation of the current. Downward movement of said movable part 51 of the field-frame is limited by an adjustable pin 55, and upward movement is controlled by a spring 59 arranged on a pin 60 on the frame, said spring bearing at one end against a nut 61 on the pin and at the other end against an ear 56 on said movable part 51. Any other movable-means arranged in the magnetic-field of the motor may be employed in lieu of that here shown, which is adapted to be moved by the attractive influence of the field when the current is caused to traverse the exciting coils of the motor.

By my present invention, in case of a light overload, the operating-device will be moved into engagement with its actuator and the actuator will be rotated at a slow speed which is proportionate to the strength of the current, but less than a speed corresponding to or in synchronism with the frequency of the current, but on a heavy overload the armature will be caused to attain its maximum speed, which corresponds or relatively corresponds to or is in synchronism with the frequency of the current, and will rotate at such speed regardless of the strength or value of the overload. Thus the speed is variable in proportion to the strength of the overload up to a point where the speed of the armature corresponds to or is in synchronism with the frequency of the current and on greater overloads is constant regardless of the strength thereof. The motor herein is or may be supplied with a brake for its armature, by which the armature is restained from rotation until after the mvoable-means 51 is moved, said brake being connected with said movable-means so as to be operated by it, or in lieu thereof other controlling-means may be provided for the armature, in case any controlling means is desired.

I claim:—

1. A selective time-limit controlling-device for electric switches, having an operating-device requiring a prolonged period of time to operate the switch, and means responsive to an overload current to actuate said operating-device, which means is constructed and arranged to consume varying periods of time in causing the operating-device to operate the switch according to the current value of the overload up to a point relatively corresponding to or in synchronism with the frequency of the current and constant periods of time regardless of the current value of the overload on overloads of higher current values, substantially as described.

2. A selective time-limit controlling-device for electric switches, comprising switch-operating means requiring a prolonged period of time to operate the switch, and an electromagnetic device responsive to an overload current to actuate said switch operating-means, which is constructed and arranged to exert a force proportionate to the current value of an overload up to a point relatively corresponding to or in synchronism with the frequency of the current where it exerts its maximum force, and to exert its maximum force on overloads of higher current value, substantially as described.

3. A selective time-limit controlling-device for electric switches comprising switch-operating means requiring a prolonged period of time to operate the switch, an electromagnetic device responsive to an overload current which is constructed and arranged to actuate said switch-operating means at a variable speed according to the current value of the overload up to a point relatively corresponding to or in synchronism with the frequency of the current, at which point its maximum speed is attained, and to actuate said switch-operating-means at its maximum speed on overloads of higher current value, substantially as described.

4. A selective time-limit controlling-device for electric-switches comprising operating-means for the switch, a movable element to control said operating-means, a coil for said movable element having its magnetic-circuit and windings proportioned relatively so that upon the occurrence of an overload the force exerted by the movable element is proportionate to the current value of the overload up to a point corresponding with the frequency of the current and above said point is constant regardless of the current value of the overload, substantially as described.

5. A selective time-limit controlling-device for electric-switches consisting of a self-restoring operating-device requiring a prolonged period of time to operate the switch, a rotary electric-motor to actuate said operating-device, which is constructed and arranged to variably respond to an overload current according to the value thereof up to a point where the motor runs in synchronism with the frequency of the current, and to definitely respond to overloads of higher current values, said operating-device being movable into and out of coöperative relation with its actuating-means by means controlled by the overload, and caused to resume its normal position when the overload ceases, substantially as described.

In testimony whereof, I have signed my name to this specification, in the presence of two subscribing witnesses.

GEORGE A. BURNHAM.

Witnesses:
D. M. SHIFFERT,
E. C. MATERHOUSE.

Copies of this patent may be obtained for five cents each, by addressing the "Commissioner of Patents, Washington, D. C."